(12) United States Patent
Jager (10) Patent No.: US 10,642,290 B2
(45) Date of Patent: May 5, 2020

(54) THERMOSTATIC CARTRIDGE FOR CONTROLLING HOT AND COLD FLUIDS TO BE MIXED

(71) Applicant: VERNET, Ollainville (FR)

(72) Inventor: Frédéric Jager, Saint-Cheron (FR)

(73) Assignee: VERNET, Ollainville (FR)

( * ) Notice: Subject to any disclaimer, the term of this patent is extended or adjusted under 35 U.S.C. 154(b) by 85 days.

(21) Appl. No.: 15/741,709

(22) PCT Filed: Jul. 7, 2016

(86) PCT No.: PCT/EP2016/066152
§ 371 (c)(1),
(2) Date: Jan. 3, 2018

(87) PCT Pub. No.: WO2017/005860
PCT Pub. Date: Jan. 12, 2017

(65) Prior Publication Data
US 2018/0196450 A1   Jul. 12, 2018

(30) Foreign Application Priority Data
Jul. 7, 2015   (FR) ..................................... 15 56441

(51) Int. Cl.
*G05D 23/13* (2006.01)
*F16K 11/06* (2006.01)
*E03C 1/04* (2006.01)

(52) U.S. Cl.
CPC .......... *G05D 23/1353* (2013.01); *F16K 11/06* (2013.01); *E03C 1/04* (2013.01)

(58) Field of Classification Search
CPC ........ F16K 11/00; F16K 11/044; F16K 27/00; F16K 27/0263; F16K 31/002;
(Continued)

(56) References Cited

U.S. PATENT DOCUMENTS 5,927,597 A * 7/1999 Bolgar ............... G05D 23/1353
                                                      236/12.2
5,931,374 A * 8/1999 Knapp ................. F16K 11/0743
                                                      137/625.41
(Continued)

FOREIGN PATENT DOCUMENTS

CN         1173929 A    2/1998
CN       101523322 A    9/2009
(Continued)

*Primary Examiner* — Jianying C Atkisson
*Assistant Examiner* — Meraj A Shaikh
(74) *Attorney, Agent, or Firm* — Knobbe, Martens, Olson & Bear, LLP (57) ABSTRACT

A cartridge has first and second separate base portions axially vertically adjacent in a stationary manner relative to one another. The first and second base portions have first and second opposing axial surfaces, such that the second surface of the first base portion and the first surface of the second base portion are applied axially against one another and include respective portions in axial contact with one another, which form a sealed joining interface between the first and second base portions. The cartridge also has a thermostat, as well as a slide valve connected to the body of the thermostat for controlling the temperature of the mixture of fluids, which moves along the axis of the base inside the first base portion to vary inversely the respective flow sections of a first passage for the first fluid and of a second passage for the second fluid.

13 Claims, 4 Drawing Sheets

(58) Field of Classification Search
CPC .... G05D 23/02; G05D 23/13; G05D 23/1346; G05D 23/021
See application file for complete search history.

(56) References Cited

U.S. PATENT DOCUMENTS

| | | | |
|---|---|---|---|
| 8,740,097 B2 * | 6/2014 | Platet | G05D 23/1353 236/12.11 |
| 2015/0041552 A1 * | 2/2015 | Maraux | G05D 23/022 236/101 R |
| 2016/0011606 A1 * | 1/2016 | Draber | G05D 23/1346 236/12.21 |

FOREIGN PATENT DOCUMENTS

| | | | |
|---|---|---|---|
| CN | 204164426 U | 2/2015 | |
| FR | 2821411 A1 | 8/2002 | |
| FR | 2 983 525 A1 | 6/2013 | |
| FR | 3003046 A1 | 9/2014 | |
| WO | WO 1996/026475 A2 | 8/1996 | |
| WO | WO 2010/072966 A1 | 7/2010 | |
| WO | WO-2013124410 A1 * | 8/2013 | ........... G05D 23/022 |
| WO | WO 2014/135614 A2 | 9/2014 | |

* cited by examiner

THERMOSTATIC CARTRIDGE FOR CONTROLLING HOT AND COLD FLUIDS TO BE MIXED

PRIORITY AND CROSS REFERENCE TO RELATED APPLICATIONS

This application is the U.S. National Phase Application under 35 U.S.C. § 371 of International Application No. PCT/EP2016/066152, filed Jul. 7, 2016, designating the U.S. and published as WO 2017/005860 A1 on Jan. 12, 2017, which claims the benefit of French Application No. FR 1556441, filed Jul. 7, 2015.

FIELD

The present invention relates to a thermostatic cartridge for controlling hot and cold fluids to be mixed.

SUMMARY

The present invention relates to a thermostatic cartridge for controlling hot and cold fluids to be mixed, in particular hot water and cold water within a sanitation facility.

BRIEF DESCRIPTION OF THE DRAWINGS

The invention will be better understood upon reading the following description, provided solely as an example and done in reference to the drawings, in which.

DETAILED DESCRIPTION

The present invention relates to a thermostatic cartridge for controlling hot and cold fluids to be mixed, in particular hot water and cold water within a sanitation facility.

In this type of cartridge, the thermostatic control is obtained using a thermostatic element expandable along an axis, on the one hand comprising a piston that is normally stationary relative to a hollow base of the cartridge, and on the other hand comprising a body rigidly connected to a control spool. This spool is movable along the axis inside the base of the cartridge so as to inversely vary the flow sections of the two fluids, called "hot fluid" and "cold fluid", supplying the base through a first of its axial sides, in order to mix those fluids in variable proportions to obtain, downstream from the spool, a mixture, called "mixed fluid", that flows along a heat-sensitive part of the thermostatic element and leaves the base through its second axial side. By modifying the position of the piston relative to the base, generally using an ad hoc adjusting mechanism, the thermostatic control temperature is set, i.e., the equilibrium temperature around which the temperature of the mixed fluid is controlled. This type of cartridge advantageously incorporates discs for controlling the flow rate of the cold and hot fluids sent toward the spool, these discs being arranged overhanging the first axial side of the base and being supplied with the cold and hot fluids via flow channels extending from the second side to the first axial side of the base. It is even possible to have only one lever to control both these discs for controlling the flow rate and the aforementioned temperature adjusting mechanism: in that case, the thermostatic cartridge is described as single-control. WO-A-96/26475 provides one example of this.

In practice, the movements of the spool between two extreme positions, for which the flow of hot fluid is completely closed and the flow of cold fluid is completely closed, respectively, are approximately a millimeter, or even less, within standard-sized cartridges. As a result, the maximum flow rates of hot fluid and cold fluid that can be allowed into the base of those cartridges are limited. This limitation of the hot fluid and cold fluid flow rates is accentuated by the fact that the arrival of these fluids at the control spool is concentrated on limited respective portions of the outer periphery of the spool: in fact, the hot and cold fluids are respectively brought to the spool by having to cross through part of the base of the cartridge, while taking into account the more or less restrictive environment in which the base is to be installed. To bypass this difficulty, it is known, for example from the aforementioned document WO-A-96/26475, to hollow, within the base of the cartridge, peripheral grooves for distributing fluid around the spool, the hot fluid and cold fluid intakes respectively emerging in those grooves. However, in practice, this solution tends to reduce the diameter of the inner free space of the base in favor of its thickness to hollow the aforementioned grooves therein, which in particular limits the outer diameter of the spool and therefore limits the maximum fluid flow rates that can be controlled by that spool. Furthermore, this solution is expensive to implement, since manufacturing the base is complex: in the event the base is made by molding plastic material, the molding core necessarily has a large diameter to accommodate the presence of retractable pins that are necessary to mold the aforementioned grooves, as well as their junction with the hot fluid and cold fluid intakes.

More recently, WO-A-2014/135614 proposed to distribute the hot and cold fluids around the spool not by two grooves defined solely by the base, but simultaneously by a first distribution channel, axially furthest from the outlet orifice, that is partially delimited by a dedicated part of the spool, and a second distribution channel, axially closest to the outlet orifice, that is partially delimited by a part fixedly attached to the inside of the base, more specifically in the outlet orifice of the base, in particular the part against which the return spring associated with thermostatic element bears. The molding constraints of the base are reduced as a result, while making it possible to avoid undercuts for the molding of these distribution channels for the hot and cold fluids: it is thus possible to produce the base in the form of a single piece that is stripped axially, without using retractable pins in the molding core. This solution makes it possible to allow greater flow rates to pass through the base to the spool, but with respect to the aforementioned second distribution channel, this solution remains restrictive, in particular in terms of dimensioning and therefore passage section of the fluid, by the aforementioned attached part, in particular by the radial thickness of this part.

The aim of the present invention is to propose a cartridge of the aforementioned type, the base of which remains simple and cost-effective to manufacture, while making it possible to favor the flow of high fluid flow rates.

To that end, the invention relates to a thermostatic cartridge for controlling hot and cold fluids to be mixed. The thermostatic cartridge comprises a base, which defines an axis and which includes first and second base parts which are separate and axially superimposed so as to be fixed on one another. Each of the first and second base parts has first and second opposite axial faces such that the second face of the first base part and the first face of the second base part are axially pressed against one another and thus include respective parts, in axial contact with one another, that form a junction interface between the first and second base parts that is sealed. This first base part delimits a first inlet orifice for a first of the cold and hot fluids, as well as a second inlet orifice for the second fluid, the first and second inlet orifices emerging separately on the first face of the first base part. The second base part delimits an outlet orifice for a mixture of the cold and hot fluids. The thermostatic cartridge further comprises a thermostatic element, which includes a piston, connected to the base, and a body, containing a thermodilatable material and positioned in the outlet orifice, the piston and the body being movable relative to one another substantially along the axis under the effect of expansion of the thermodilatable material. The thermostatic cartridge further comprises a spool for regulating the temperature of the mixture, which has first and second opposite axial faces, respectively turned toward the first face of the first base part and toward the second face of the second base part, and which is connected to the body of the thermostatic element to be moved substantially along the axis inside the first base part so as to inversely vary the respective flow sections of a first passage for the first fluid and a second passage for the second fluid. This first passage is axially delimited between the first axial face of the spool and the first base part and is supplied by the first inlet orifice. This second passage is axially delimited between the second face of the spool and the second base part and being supplied by the second orifice via a distribution channel for distributing the second fluid around the spool, this distribution channel for the second fluid being formed between the second face of the first base part and the first face of the second base part.

One of the ideas at the base of the invention is to go beyond the traditional design of the single-piece base, recognized for its intrinsic sealing, in favor of producing the base in two separate parts, which are axially superimposed on one another and which are permanently fastened to one another at a junction interface, which is formed by axially applying their respective outer faces turned toward one another against one another, and which is provided to be sealed. The hot and cold fluids to be regulated by the cartridge according to the invention enter through the first of these two base parts in order to reach the regulating spool, downstream from which the fluid mixture is discharged via an outlet orifice delimited by the second base part. According to the invention, the incoming fluid, for which the opening and closing of the passage toward the outlet orifice is controlled by the face of the spool turned toward the second base part, is distributed around the spool by a distributing channel formed at the junction between the first and second base parts:

in this way, this distribution channel can have a much larger fluid passage section than if the base was made in a single piece. In particular, this distribution channel can be radially very extensive, in particular in the direction moving away from the central axis of the cartridge, without worrying about molding and stripping constraints of the first base part, with the understanding that, after sealed fastening of the two base parts to one another, this distribution channel is axially closed by the second base part. In the extension of the foregoing considerations, it will be understood that the fluid inlet orifice, supplying this distribution channel, can also be provided with a large radial dimension and/or a greatly radially offset position, which thus increases the fluid passage section in this inlet orifice.

According to additional advantageous features of the cartridge according to the invention:

The distribution channel for the second fluid is delimited both by the first face of the second base part and hollowed out in the second face of the first base part.

The distribution channel for the second fluid extends, around the axis, over 360° and thus distributes the second fluid all around the spool.

A flow channel for the first fluid from the second face of the second base part to the first face of the first base part is formed jointly by a first flow channel for the first fluid, delimited by the first base part and connecting the first and second faces of the first base part to one another, and by a second flow channel for the first fluid, delimited by the second base part and connecting the first and second faces of the second base part to one another, these first and second flow channels for the first fluid being directly connected to one another while emerging in one another at the junction interface; and a flow channel for the second fluid from the second face of the second base part to the first face of the first base part is formed jointly by a first flow channel for the second fluid, delimited by the first base part and connecting the first and second faces of the first base part to one another, and by a second flow channel for the second fluid, delimited by the second base part and connecting the first and second faces of the second base part to one another, these first and second flow channels for the second fluid being directly connected to one another while emerging in one another at the junction interface, The second inlet orifice emerges primarily axially in the distribution channel for the second fluid.

The second inlet orifice emerges exclusively axially in the distribution channel for the second fluid.

The first base part inwardly has a substantially cylindrical surface, which is centered on the axis and which extends axially from the second face of the first base part toward the first face of the first base part, while successively delimiting the distribution channel of the second fluid and the second inlet orifice.

The second inlet orifice includes a connecting part between a mouth of the second inlet orifice at the first face of the first base part and the distribution channel for the second fluid, this connecting part of the second inlet orifice being radially further away from the axis then said mouth.

The first base part inwardly has a surface for deflecting the flow of the second fluid between said mouth and said connecting part.

The junction interface is transverse to the axis.

The junction interface is substantially planar and extends substantially perpendicular to the axis.

The first face of the second base part includes a seat for axial bearing of the second face of the spool, the second passage being axially delimited between this seat and the second face of the spool.

The seat protrudes axially relative to the first face of the second base part.

The first and second base parts are made from plastic; and the plastic materials making up the respective parts of the second face of the first base part and the first face of the second base part, which form the junction interface, are welded to one another so as to seal this junction interface, in particular by laser welding.

The respective parts of the second face of the first base part and the first face of the second base part, which form the junction interface, are provided with seals and/or sealing gaskets so as to seal this junction interface.

FIGS. 1 to 5 show a thermostatic cartridge 1 that is arranged around and along a central axis X-X. This cartridge is suitable for equipping a faucet mixing hot water and cold water, not shown as such in the figures, or more generally, for equipping a sanitary facility.

Figure 3:
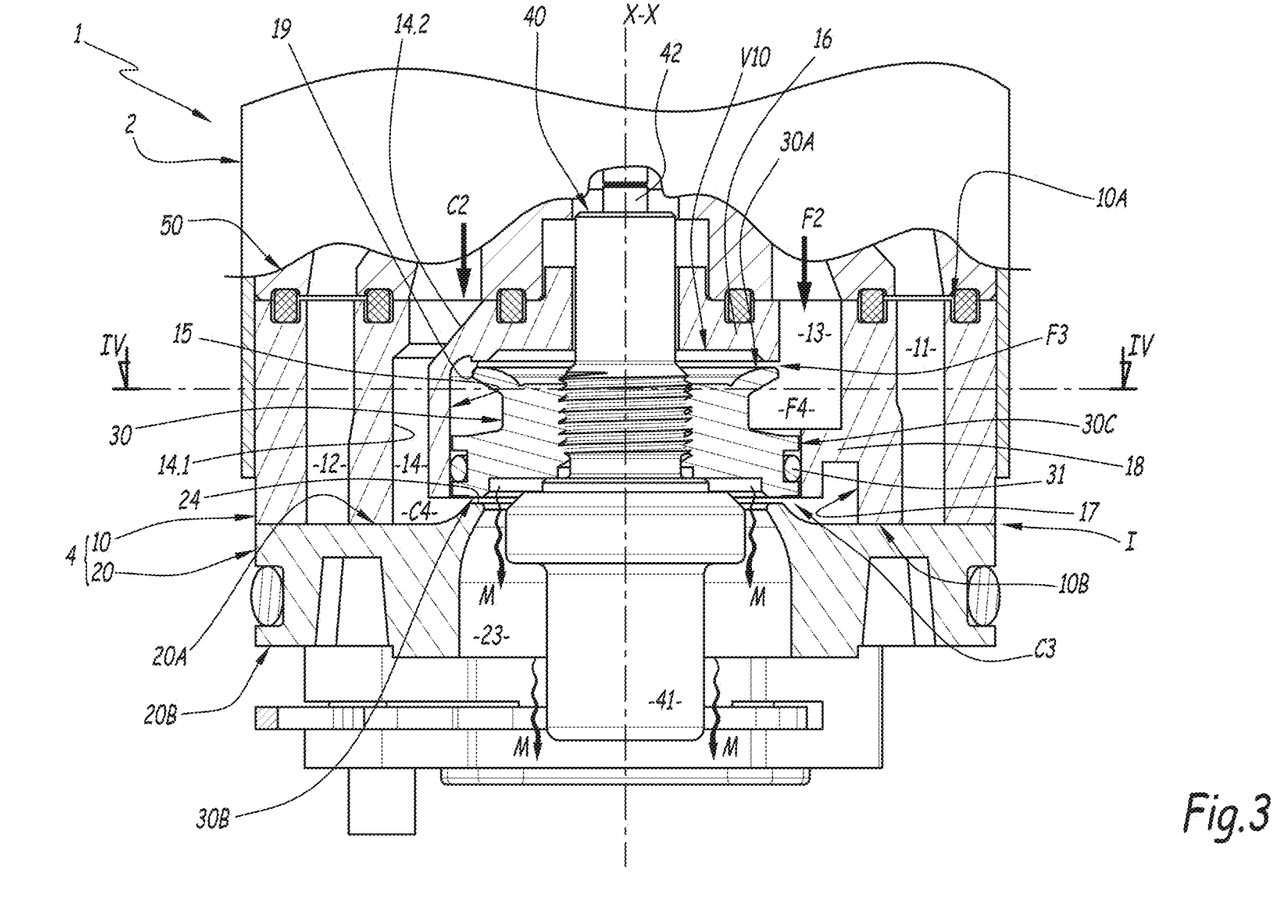
FIG. 3 is a partial longitudinal sectional view of the cartridge of FIG. 1 in the assembled state.
Figure 5:
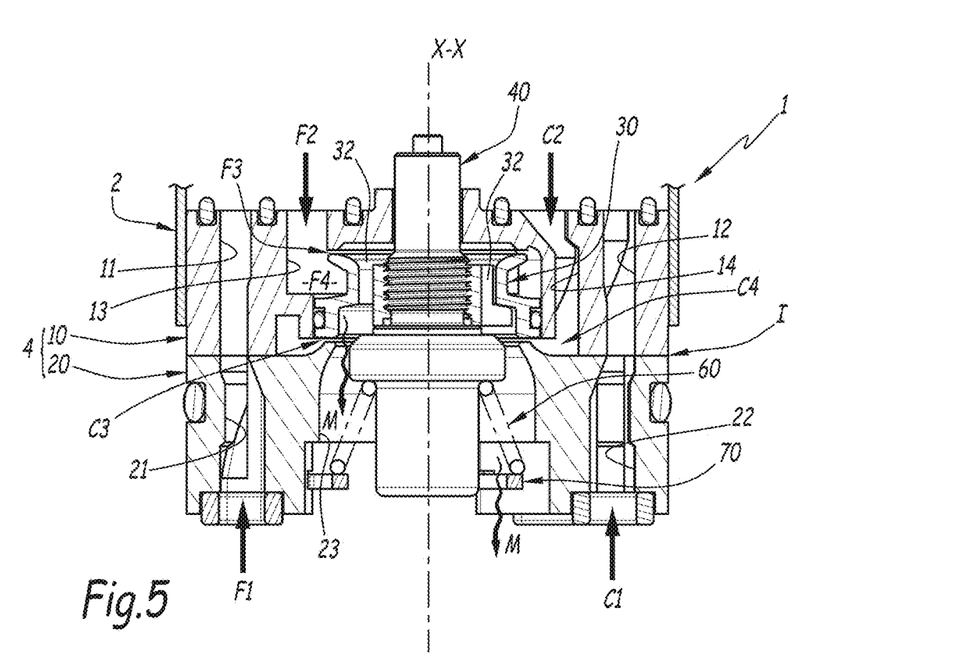

For convenience, the rest of the description is oriented relative to the axis X-X, considering that the terms "upper", "top" and the like correspond to an axial direction turned toward the upper part of FIGS. 3 and 5, while the terms "lower", "bottom" and the like correspond to an axial direction in the opposite sense.

The thermostatic cartridge 1 includes an upper housing 2 and a lower base 4, which, in the assembled state of the cartridge, are fixedly assembled to one another.

The base 4 has a globally cylindrical outer shape, centered on the axis X-X and with a circular base. As clearly shown in FIGS. 1 to 3 and 5, the base 4 primarily includes two separate parts that are arranged one above the other along the axis X-X, i.e., an upper part 10 and a lower part 20. Each of these base parts 10 and 20 has an upper outer face 10A, 20A and, axially opposite the latter, a lower outer face 10B, 20B. In the assembled state of the cartridge 1 and therefore in the assembled state of the base 4, the base parts 10 and 20 are axially superimposed so as to be fixed on one another, the lower face 10B of the upper part 10 covering the upper face 20A of the lower part 20, while being in direct contact with the latter. Thus, as clearly shown in FIGS. 3 and 5, the lower face 10B of the upper part 10 and the upper face 20A of the lower part 20 are axially pressed against one another such that part of this face 10B and part of this face 20A are in axial contact with one another and thus form a junction interface I between the base parts 10 and 20. This junction interface I extends transversely to the axis X-X. In the example embodiment considered in the figures, this interface I extends essentially perpendicular to the axis X-X, the respective parts in contact with one another of the lower face 10B of the base part 10 and the upper face 20A of the base part 20 being planar and extending perpendicular to the axis X-X.

Because the hot water and the cold water flow through the base, between the lower face 20B of the lower part 20 and the upper face 10A of the upper part 10, the junction interface I is provided to be sealed in that the material contact zones between the lower face 10B of the base part 10 and the upper face 20A of the base part 20 are sealed, while prohibiting the passage of fluid through these contact zones. In other words, the respective parts forming the interface I of the spaces 10B and 20A are in sealed contact with one another, no liquid being able to flow, via the contact interface of these parts, between the base parts 10 and 20. Preferably, for bulk reasons in the direction of the axis X-X, the sealing of the junction interface I is not done by seals or sealing gaskets, which would be attached axially between the base parts 10 and 20, but this sealing is done by a material link between the base parts 10 and 20. In practice, such a material link between the base parts 10 and 20 is done by glue or, preferably, by welding of the base parts 10 and 20 to one another: thus, according to one preferred embodiment, the base parts 10 and 20 are made from plastic and are welded at their sealed junction interface, in particular laser welded, the plastic material of one of these base parts 10 and 20 being transparent while the plastic material of the other is opaque at the wavelength of the welding laser used. Of course, various techniques other than laser welding can be considered so as, at their junction interface I, to weld the plastic materials making up the base parts 10 and 20, respectively, directly to one another.

As clearly shown in FIGS. 1, 2, 4 and 5, the upper base part 10 delimits, over its entire axial dimension, a cold water flow channel 11 and a hot water flow channel 12, each of these channels connecting the upper 10A and lower 10B faces of the base part 10 to one another, while emerging on these upper and lower faces. Likewise, as clearly shown in FIGS. 1, 2 and 5, the lower base part 20 delimits, over its entire axial dimension, a cold water flow channel 21 and a hot water flow channel 22, each of these channels connecting the upper 20A and lower 20B faces of the base part 20 to one another, while emerging freely on these upper and lower faces. As shown in FIG. 5, in the assembled state of the base 4, the cold water flow channels 11 and 21 are directly connected to one another, through the junction interface I, while emerging in one another at the axial level of this interface I. The same is true for the hot water flow channels 12 and 22. In other words, in the assembled state of the base 4, a cold water flow channel between the lower face 20B of the base part 20 and the upper face 10A of the base part 10 is formed jointly by the channels 11 and 21, while successively being delimited by the base parts 20 and 10 and while axially crossing the junction interface I. Likewise, a hot water flow channel between the faces 20B and 10A is formed jointly by the channels 12 and 22, while being delimited successively by the base parts 20 and 10 and while axially crossing the junction interface I.

Figure 2:
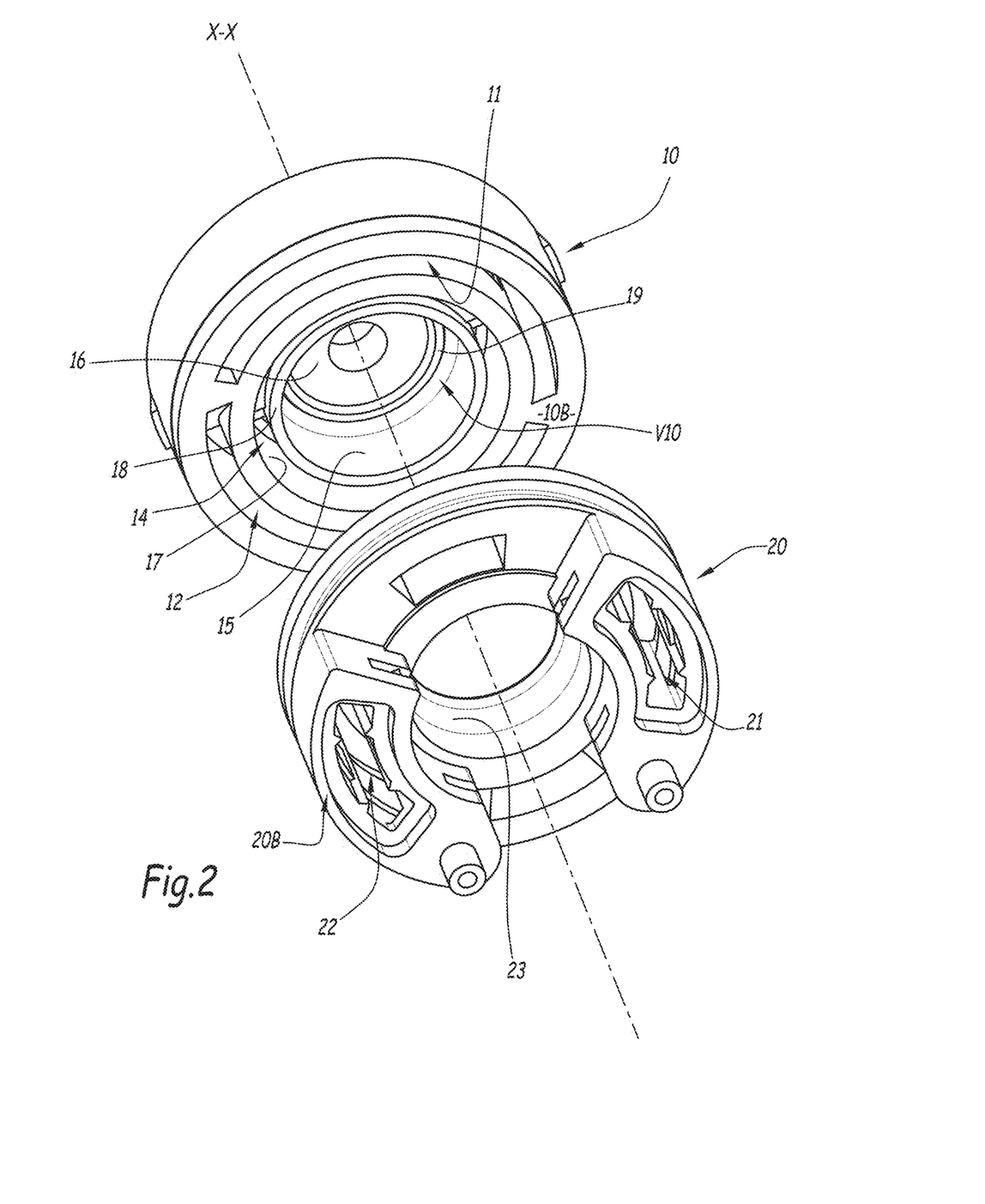
FIG. 2 is a view similar to FIG. 1, showing, from another viewing angle, a base of the cartridge.

As clearly shown in FIG. 2, the upper base part 10 also delimits a free inner space V10 that is traversed by the axis X-X, while being substantially centered on this axis. On either side and separately from this inner space V10, the base part 10 further delimits a cold water inlet orifice 13 and a hot water inlet orifice 14, which, at their upper end, each emerge on the upper face 10A of the base part 10, while, at their lower end, these inlet orifices 13 and 14 emerge in the inner space V10, the lower end of the inlet orifice 14 being situated axially lower than that of the inlet orifice 13, as shown in FIGS. 3 and 5. The flow channels 11 and 12 and the inlet orifices 13 and 14 are angularly and radially positioned relative to the axis X-X so as not to communicate directly with one another.

The lower base part 20 in turn delimits a mixing outlet orifice 23, which is substantially centered on the axis X-X and which connects the upper 20A and lower 20B faces of the base part 20 to one another, while emerging on these upper and lower faces. As clearly shown in FIGS. 2 and 5, the flow channels 21 and 22 and the outlet orifice 23 are angularly and radially positioned relative to the axis X-X so as not to communicate directly with one another.

The inner space V10 of the base part 10 emerges downwardly on the lower face 10B of the base part 10 such that, in the assembled state of the base 4, this inner space V10 is directly connected to the outlet orifice 23 of the base part 20 through the junction interface I, this space V10 and this outlet orifice 23 emerging directly in one another in a centered manner on the axis X-X.

During use, the flow channels 11 and 21 on the one hand and the flow channels 12 and 22 on the other hand are provided to be respectively supplied with cold water and hot water, from the lower face 20B of the lower base part 20, as indicated by arrows F1 and C1 in FIG. 5. Additionally, after having left the base 4 through the upper face 10A of its upper base part 10 and having flowed inside the housing 2 as mentioned in slightly more detail later, this cold water and this hot water are turned back, from the inside of the housing 2, toward the upper face 10A of the base part 10 so as to respectively supply the inlet orifices 13 and 14, as indicated by arrows F2 and C2 in FIGS. 3 and 5. This cold water and hot water, flowing downwardly in the inlet orifices 13 and 14, respectively, next supply the inner space V10 of the base part 10, in which they mix in the form of mixed water, which, as indicated by arrows M in FIGS. 3 and 5, pass from the inner space V10 to the outlet orifice 23 through the junction interface I. The mixture of the cold water and the hot water then leaves the base 4, while being discharged toward the bottom of the outlet orifice 23.

Figure 1:
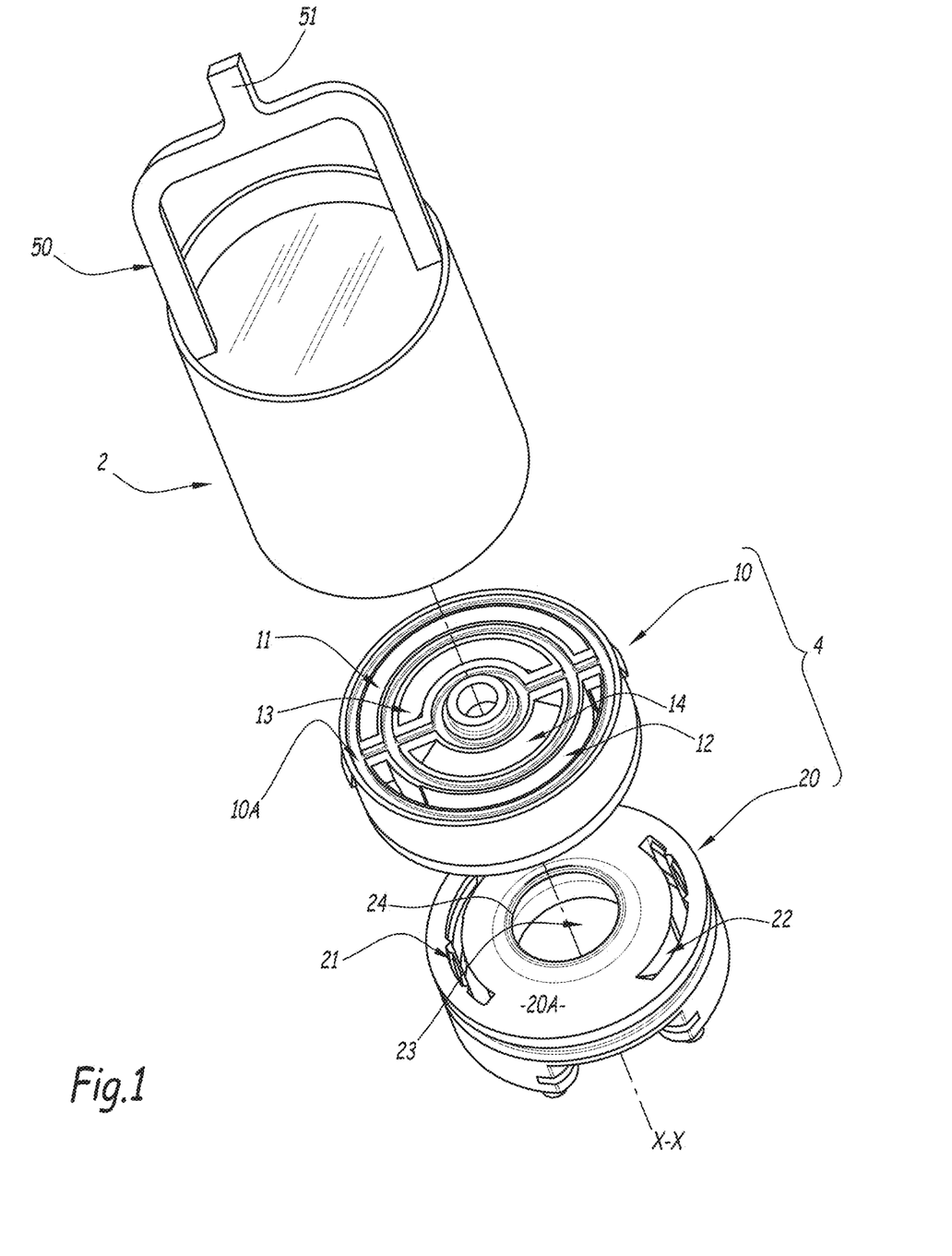
FIG. 1 is an exploded perspective view of a thermostatic cartridge according to the invention.

Advantageously, in particular to favor the cold water and hot water flow rates respectively flowing in the inlet orifices 13 and 14, those inlet orifices 13 and 14 each extend over approximately 180° around the axis X-X, while being diametrically opposite one another, as clearly shown in FIG. 1.

As shown in FIGS. 2, 3 and 5, the inner space V10 of the base part 10 is stepped in the direction of the axis X-X, while being more radially extended in its lower part than in its upper part. More specifically, in its upper part, the inner space V10 is delimited by a cylindrical surface 15, which is centered on the axis X-X, which has a circular base, and which extends axially downward from the outer periphery of the lower surface of a wall 16 belonging to the upper part of the base 10, this wall 16 axially upwardly closing the inner space V10. This cylindrical surface 15 extends over 360° around the axis X-X, while being interrupted, around this axis, by the lower mouth of the cold water inlet orifice 13, as shown in the left part of FIG. 3, as well as the right part of FIG. 5.

In its lower part, the inner space V10 is delimited by a cylindrical surface 17, which is centered on the axis X-X, which has a circular base and which has a diameter strictly larger than that of the cylindrical surface 15. In the example embodiment considered in the figures, the cylindrical surfaces 15 and 17 are connected to one another by a stepped wall 18, which, in its peripheral part connected to the cylindrical surface 17, is advantageously upwardly hollowed out. In the direction of the axis X-X, the cylindrical surface 17 extends downward to the lower face 10B of the base part 10, on which this cylindrical surface 17 emerges. Around the axis X-X, the cylindrical surface 17 extends over 360°, advantageously without being interrupted by the hot water inlet orifice 14 at the mouth of the latter into the inner space V10: indeed, this inlet orifice 14 emerges primarily, or even, like here, exclusively, axially in the lower part of the inner space V10, the cylindrical surface 17 extending axially upward to delimit the wall and the inlet orifice 14, radially furthest from the axis X-X, as clearly shown in FIGS. 2 and 3.

Before describing the other components of the cartridge 1, it will be noted that the stepped shape of the inner space V10 of the base part 10 allows this base part 10 to be obtained easily by molding plastic, in particular injected plastic. Indeed, during the manufacture of this base part 10 by molding, a molding core can advantageously be provided to occupy the inner space V10 such that, without using a retractable molding pin, the stripping of the base part 10 consists of a relative downward translation of the core, that stripping being particularly easy without any undercut.

Furthermore, as clearly shown in FIGS. 3 and 5, the diameter of the cylindrical surface 17 is strictly larger than the diameter of the outlet orifice 23, in particular the mouth of the latter on the upper face 20A of the base part 20. It will therefore be understood that, in the assembled state of the base 4, the lower end of the cylindrical surface 17 is connected to the outlet orifice 23 by a solid part of the upper surface 20A of the base part 20.

Figure 4:
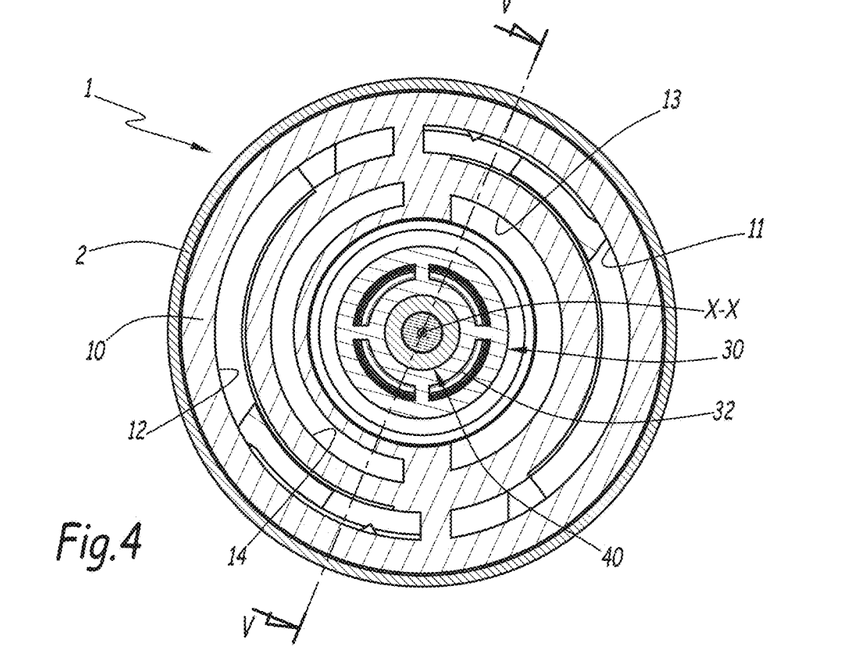
FIGS. 4 and 5 are cross-sections along line IV-IV of FIG. 3 and line V-V of FIG. 4, respectively.

The thermostatic cartridge 1 also includes a spool 30 which, as clearly shown in FIGS. 3 to 5, has a globally tubular shape, with a circular base and centered on an axis which, in the assembled state of the cartridge, is aligned with the axis X-X. This spool 30 has an upper outer face 30A and a lower outer face 30B, as well as a lateral outer face 30C, which connects the upper 30A and lower 30B faces to one another. This lateral face 30C is substantially cylindrical, while being centered on the axis X-X and having a circular base, its diameter being substantially equal to that of the cylindrical surface 15 of the base part 10. Inside this lateral face 30C, a peripheral groove is hollowed out inside which a sealing gasket 31 is received.

The spool 30 is mounted on the base 4, more specifically inside the inner space V10 of the base part 10, movably along the axis X-X between two extreme positions, i.e.:
  an extreme high position, in which the upper face 30A of the spool 30 bears against a seat 19, which is secured to the base part 10 and the outside of which is supplied by the cold water leaving the inlet orifice 13, having noted that, in the example embodiment considered here, this seat 19 is delimited by the lower surface of the upper wall 16 of the base part 10, while being provided downwardly axially protruding from the rest of this lower surface; and
  an extreme low position, in which the lower face 30B of the spool 30 bears against a seat 24, which is secured to the base part 20 and the outside of which is supplied by the hot water leaving the inlet orifice 14, having noted that, in the example embodiment considered here, this seat 24 is delimited by the upper face 20A of the base part 20, while being provided upwardly axially protruding from the rest of this upper face 20A.

The total axial dimension of the spool 30, separating its opposite faces 30A and 30B from one another, is smaller than the axial distance separating the seats 19 and 24 from one another. Consequently, when the spool 30 is in its extreme low position, the spool closes off a hot water intake inside the seat 24, while maximally opening a cold water passage F3 that is axially delimited between the upper face 30A of the spool 30 and the seat 19. Conversely, when the spool 30 is in its upper extreme position, the spool closes off the intake of cold water inside the seat 19, while maximally opening a hot water passage C3 that is axially delimited between the lower face 30B of the spool 30 and the seat 24. Of course, depending on the position of the spool 30 along the axis X-X between its upper and lower extreme positions, the respective flow sections of the cold water passage F3 and the hot water passage C3 vary inversely, which means that the quantities of cold water and hot water allowed inside the seats 19 and 24 are controlled, in inverse respective proportions, by the spool 30 depending on its axial position. In FIGS. 3 and 5, the spool 30 occupies an intermediate axial position between its upper and lower extreme positions.

Advantageously, the seats 19 and 24 have substantially equal relative diameters, which limits the pressure differentials between the upper 30A and lower 30B faces of the spool 30.

To ensure guiding of the movable assembly of the spool 30 in the inner space V10 of the base part 10, the side face 30C of the spool 30 is received in a substantially adjusted manner inside the cylindrical surface 15, with radial interposition of the sealing gasket 31.

It will be noted that, in order for the cold water allowed inside the seat 19 to be able to reach and mix with the hot water allowed inside the seat 24, then forming the aforementioned mixture of cold water and hot water flowing, downstream from the spool 30, to the outlet orifice 23, the spool 30 inwardly delimits one or more flow passages 32 connecting its upper 30A and lower 30B faces to one another. This or these flow passage(s) 32, which are visible in FIGS. 4 and 5, are not limiting on the present invention and will therefore not be described in more detail.

Below the sliding and tight bearing zone of the spool 30 against the cylindrical surface 15 of the base part 10, the hot water coming from the inlet orifice 14 supplies the seat 24 via a channel C4 for distributing hot water around the spool 30. This hot water distribution channel C4 is formed between the base parts 10 and 20, substantially at the axial level of the junction interface I: in the example embodiment considered in the figures, the distribution channel C4 is downwardly delimited by the upper face 20A of the base part 20, more specifically by the solid part of this face 20A extending, radially to the axis X-X, from the lower end of the cylindrical surface 17 to the seat 24, whereas upwardly, the distribution channel C4 is delimited hollowed out in the lower face 10B of the base part 10, more specifically by the cylindrical surface 17 as well as by the stepped wall 18. Thus the hot water flowing in the inlet orifice 14 flows in the hot water distribution channel C4, while being distributed all around the spool 30 due to the fact that the cylindrical surface at 17 extends over 360° around the axis X-X, so as to distribute the supply from the hot water passage C3 over the entire outer periphery of the spool. Inasmuch as the diameter of the cylindrical surface 17 can be dimensioned with a large value, without being constrained by manufacturing difficulties of the base 4 if the latter had been made in a single piece, it will be understood that the passage section for the hot water in the distribution channel C4 can be provided to be particularly large, thereby favoring the flow of a high hot water flow rate through the base 4.

In the extension of the foregoing considerations, due to the fact that the hot water inlet orifice 14 emerges primarily, or even exclusively, axially in the distribution channel C4, while being delimited by the cylindrical surface 17 with a large diameter, it will be understood that, advantageously, this inlet orifice 14 also has a large passage section for the hot water. In particular, like in the example embodiment considered in the figures, the major part 14.1 of the inlet orifice 14, connecting its upper mouth to the distribution channel C4, may be radially more separated from the axis X-X than its upper mouth, the radial position of the latter being able to be constrained by the presence of sealing elements on the upper face 10A of the base part 10 and/or by the connecting specificities of this upper face 10A to the inner arrangements of the housing 2. In this case, as an advantageous option, the base part 10 inwardly has a surface 14.2 deflecting the flow of hot water between the upper mouth of the inlet orifice 14 and the major part 14.1 of this inlet orifice 14.

According to one advantageous optional arrangement, which is implemented in the example embodiment considered in the figures, a channel F4 for distributing the cold water around the spool 30 can be provided above the sliding and sealed bearing zone of the spool 30 against the cylindrical surface 15 of the base part 10. As clearly shown in FIGS. 3 and 5, this distribution channel F4 is jointly delimited by the upper part of the cylindrical surface 15 and the upper part of the lateral face 30C of the spool 30, this upper part of the lateral face 30C advantageously being hollowed out as explained in FR-A-2,983,985, to which the reader may refer for more details.

To drive the movement of the spool 30 and thus control its axial position, the thermostatic cartridge 1 also includes a thermostatic element 40 whereof the body 41, which is centered on the axis X-X in the assembled state of the cartridge, is fixedly secured to the spool 30. This body 41 contains a thermodilatable material which, under the action of the heat from the mixture of hot water and cold water, flowing downstream from the spool 30 along \this body 41, extends and causes the relative movement, in translation along the axis X-X, of a piston 42 of the thermostatic element 40, that piston 42 itself also being substantially centered on the axis X-X in the assembled state of the cartridge.

The terminal part of the piston 42 opposite the body 41, in other words the upper terminal part of the piston 42, is connected to the base 4 by a mechanical assembly 50, which is housed inside the housing 2 and which, in a known manner, is able to adjust the axial altitude of the piston 42 relative to the base 4, independently of the relative position of the body 41: this means that this mechanical assembly 50 is designed to control the temperature of the mixture of cold water and hot water leaving the base 4, by adjusting the thermostatic equilibrium temperature around which the temperature of the mixture is controlled. Inasmuch as the embodiment of the mechanical assembly 50 is not limiting on the present invention, this mechanical assembly 50 is not shown in detail in the figures and will not be described in more detail here, having nevertheless noted that, in the example embodiment considered in the figures, this mechanical assembly 50 is advantageously suitable for also controlling the flow rate of the mixture of cold water and hot water leaving the base 4, by adjusting, typically using ceramic discs, the placement in communication of the cold water flow channel 11 with the cold water inlet orifice 13 and the placement in the communication of the hot water flow channel 12 with the hot water inlet orifice 14. Preferably and as is also the case for the example embodiment considered in the figures, the mechanical assembly 50 includes a single lever 51 allowing the user to control the flow rate and temperature of the mixture. In this respect, the reader may refer, for example, to prior art document WO-A-2010/072966.

The cartridge 1 further includes a compression spring 60, which, for visibility reasons, is only shown in FIG. 5, and only schematically. This spring 60 acts on the spool 30 so as to oppose the deployment of the piston 42 relative to the body 41 of the thermostatic element 40, while being axially inserted between this spool and the base 4, more specifically between this spool and a piece 70, fixedly attached to the base part 20, through the lower mouth of the outlet orifice 23.

Of course, the invention is not limited to the embodiment described thus far and illustrated, various alternatives and options being able to be considered. As examples:
   rather than protruding from the upper face 20A of the base part 20, the seat 19 may be provided to be substantially flush with the rest of this upper face 20A; in this case, the lower part of the spool 30 is extended by an ad hoc wall, for example frusticonical and diverging downward, the lower end of which can cooperate with the seat for the opening-closing of the hot water passage C3; and/or
   rather than extending over 360° around the axis X-X, the hot water distribution channel C4 can have a smaller circumferential span, to the detriment of a distribution of hot water all around the drawer 30.

What is claimed is:

1. A thermostatic cartridge for controlling cold and hot fluids to be mixed, comprising:
   a base, which defines an axis and which includes first and second base parts which are separate and axially superimposed so as to be fixed on one another, each of the first and second base parts having first and second opposite axial faces such that the second face of the first base part and the first face of the second base part are axially pressed against one another and thus so that the second face of the first base part and the first face of the second base part respectively include respective parts, contact portions which are in axial contact with one another and which form a sealed junction interface between the first and second base parts, the first base part delimiting a first inlet orifice for a first fluid among the cold and hot fluids, as well as a second inlet orifice for a second fluid among the cold and hot fluids, the first and second inlet orifices emerging separately on the first face of the first base part, the second base part delimiting an outlet orifice for a mixture of the cold and hot fluids;
   a thermostat, which includes a piston, connected to the base, and a body, containing a thermodilatable material and positioned in the outlet orifice, the piston and the body being movable relative to one another substantially along the axis under the effect of expansion of the thermodilatable material; and
   a spool for regulating the temperature of the mixture, which has first and second opposite axial faces, respectively facing toward the first face of the first base part and toward the second face of the second base part, and which is arranged within the first base part,
   wherein the second face of the first base part includes a first seat for axial bearing of the first face of the spool,
   wherein a first passage for the first fluid is axially delimited between the first seat and the first face of the spool and is supplied by the first inlet orifice,
   wherein the first face of the second base part includes a second seat for axial bearing of the second face of the spool,
   wherein a second passage for the second fluid is axially delimited between the second seat and the second face of the spool and is supplied by the second inlet orifice via a distribution channel for distributing the second fluid around the spool, the distribution channel for the second fluid being formed between the second face of the first base part and the first face of the second base part,
   and wherein the spool is connected to the body of the thermostat to be moved along the axis within the first base part so as to vary a flow section of the first passage and a flow section of the second passage in inverse ratio.

2. The cartridge according to claim 1, wherein the distribution channel for the second fluid is delimited both by the first face of the second base part and by a hollow portion of the second face of the first base part.

3. The cartridge according to claim 1, wherein the distribution channel for the second fluid extends, around the axis, over 360° and thus distributes the second fluid all around the spool.

4. The cartridge according to claim 1:
   wherein a flow channel for the first fluid from the second face of the second base part to the first face of the first base part is formed jointly by a first flow channel for the first fluid, delimited by the first base part and connecting the first and second faces of the first base part to one another, and by a second flow channel for the first fluid, delimited by the second base part and connecting the first and second faces of the second base part to one another, these first and second flow channels for the first fluid being directly connected to one another while emerging in one another at the sealed junction interface, and
   wherein a flow channel for the second fluid from the second face of the second base part to the first face of the first base part is formed jointly by a first flow channel for the second fluid, delimited by the first base part and connecting the first and second faces of the first base part to one another, and by a second flow channel for the second fluid, delimited by the second base part and connecting the first and second faces of the second base part to one another, these first and second flow channels for the second fluid being directly connected to one another while emerging in one another at the sealed junction interface.

5. The cartridge according to claim 1, wherein the second inlet orifice emerges axially in the distribution channel for the second fluid.

6. The cartridge according to claim 1, wherein the first base part has an inner cylindrical surface, which is centered on the axis and which extends axially from the second face of the first base part toward the first face of the first base part, while successively delimiting the distribution channel of the second fluid and the second inlet orifice.

7. The cartridge according to claim 1, wherein the second inlet orifice includes a connecting part between a mouth of the second inlet orifice at the first face of the first base part and the distribution channel for the second fluid, the connecting part of the second inlet orifice being radially further away from the axis than the mouth.

8. The cartridge according to claim 7, wherein the first base part has an inner surface for deflecting flow of the second fluid between the mouth and the connecting part.

9. The cartridge according to claim 1, wherein the sealed junction interface is transverse to the axis.

10. The cartridge according to claim 1, wherein the sealed junction interface is planar and extends perpendicular to the axis.

11. The cartridge according to claim 1, wherein the second seat extends axially relative to the first face of the second base part.

12. The cartridge according to any one of the preceding claims, wherein the first and second base parts are made from plastic and wherein the plastic materials making up the contact portions of the second face of the first base part and the first face of the second base part are welded to one another so as to seal the sealed junction interface.

13. The cartridge according to claim 1, wherein the contact portions of the second face of the first base part and the first face of the second base part are provided with seals or sealing gaskets so as to seal the sealed junction interface.

* * * * *